May 29, 1934.   A. F. HENNINGER, JR   1,960,245
FLASHING NEGATIVE GLOW DISPLAY DEVICE
Filed Feb. 28, 1931   2 Sheets-Sheet 1
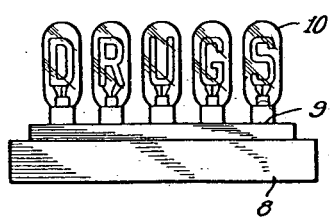
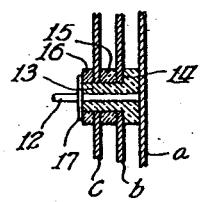
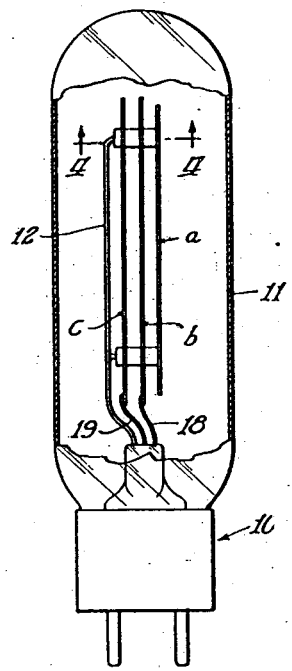
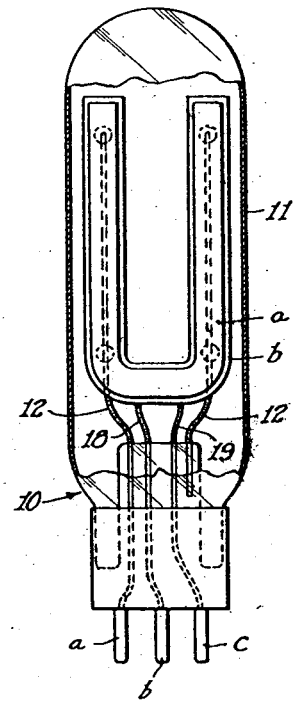
Inventor
Andrew F. Henninger, Jr.
By Banning May 29, 1934.　　　A. F. HENNINGER, JR　　　1,960,245
FLASHING NEGATIVE GLOW DISPLAY DEVICE
Filed Feb. 28, 1931　　　2 Sheets-Sheet 2
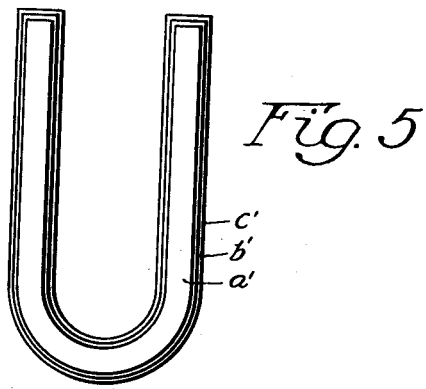
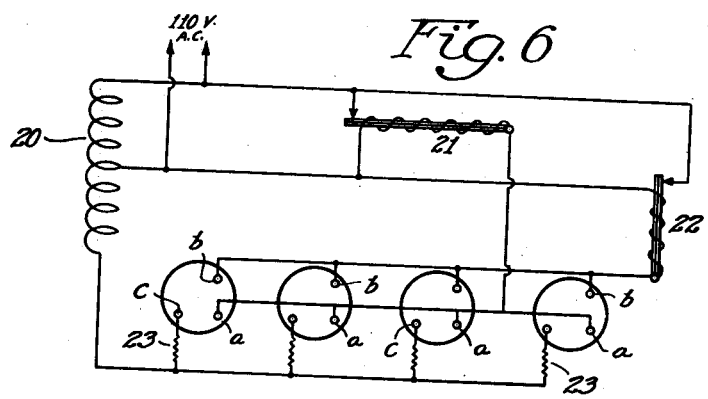
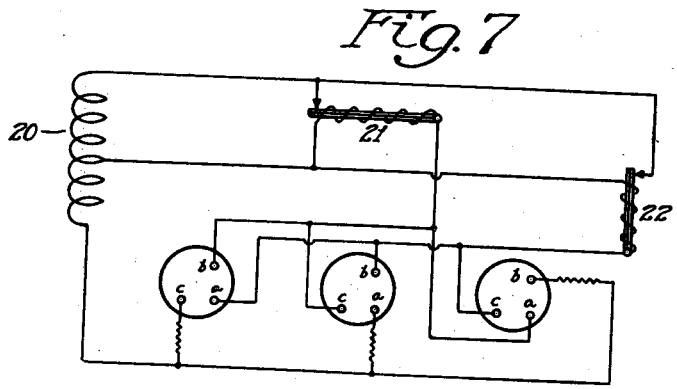
Inventor
Andrew F. Henninger, Jr.
By Jabel & Banning
Attys Patented May 29, 1934

1,960,245

UNITED STATES PATENT OFFICE 1,960,245

FLASHING NEGATIVE GLOW DISPLAY DEVICE

Andrew F. Henninger, Jr., Chicago, Ill.

Application February 28, 1931, Serial No. 518,981

8 Claims. (Cl. 176—124)

This invention relates to negative glow display devices and particularly to a construction and control means therefor by which signs or display devices may be built from any number of individual characters or figures.

My invention contemplates as one of its objects the provision of an improved display device by the utilization of characters or figures for electrodes in negative glow devices which characters or figures are caused to glow with a distinctive color and in different combinations depending upon the path of current between the electrodes which make up each character or figure. To this end, each character or figure is preferably made up of a plurality of units or electrodes each of which in itself takes the form of the character or figure.

My invention also contemplates the provision of a novel arrangement of electrodes within the envelope of the negative glow device or devices which make up the display pattern in combination with control means whereby one may cause successive changes in the appearance of the characters or figures without destroying their identity.

My invention also contemplates a novel mounting scheme for the electrodes and the negative glow devices whereby to insure permanent alignment and positioning of the parts thereof which is necessary to give the desired effects.

Other objects and advantages of the invention will appear as the description proceeds in connection with the accompanying drawings wherein the preferred form of the invention is shown. It is to be understood, however, that this disclosure is illustrative only and that many minor modifications may be made without departing from the scope of the invention as above outlined and as defined by the claims.

In the drawings—

Fig. 1 is a front view of a sign made up from a plurality of negative glow devices;

Fig. 2 is a side view partly in section of one of the negative glow devices;

Fig. 3 is a front view partly in section of one of the negative glow devices;

Fig. 4 is a fragmentary section on the line 4—4 of Fig. 2;

Fig. 5 shows the modified arrangement of the electrodes shown in Fig. 2; and

Figs. 6 and 7 illustrate wiring diagrams for the control of the negative glow devices.

Referring now in detail to the drawings, the sign or display device in Fig. 1 may be made up from a base 8 having a plurality of sockets 9 thereon which sockets are adapted to receive the negative glow devices 10 each of which forms a character or figure. As shown in the present drawings, the characters represented are letters of the alphabet although it is desired that they may take any desired form.

The negative glow devices consist of the envelope 11 having mounted therein a plurality of spaced electrodes $a$, $b$, and $c$ and having a gaseous filling of some suitable gas such for example as neon or argon which forms the conducting medium between the electrodes $a$, $b$, and $c$. The electrodes may be made of any suitable conducting material such for example as nickel, and, in the manufacture of the device, the usual methods of removing the air and other gases from the interior of the envelope 11 and the electrodes is, of course, employed. The gas pressure within the envelope may be made any desirable amount that is found proper for the particular gas employed and for the effects desired.

In mounting the electrodes, it is to be noted that the electrode $a$, which forms the front electrode when looking at the sign, is somewhat smaller in surface area than electrode $b$ for example. In the form shown in Fig. 2, however, electrodes $b$ and $c$ are of substantially the same size. In the modified form shown in Fig. 5, the electrodes gradually increase in size from front to back so that, upon looking at the sign from the front, electrode $a'$ forms the main body of the letter, electrode $b'$ forms a border therearound, and electrode $c'$ gives an additional border.

In order to insure proper alignment and spacing of the electrodes, I employ the mounting structure shown in section in Fig. 4. In this mounting structure, the supporting wire 12 is welded or otherwise secured to electrode $a$, and then the insulator 13 is pressed against the back of the electrode $a$, and electrode $b$ is fitted thereon so as to bear up against the shoulder 14 on the insulator. An insulating washer 15 is mounted between electrodes $b$ and $c$, and a further insulating washer 16 fits over electrode $c$. The washers and insulators are held in place by any suitable means such for example as the wire 17 welded onto the supporting wire 12. There may be one or more of these supporting wires 12 on which the electrodes are mounted. In the present instance, two are shown, one of them forming the conducting lead for electrode $a$. Electrodes $b$ and $c$ are provided with conducting means 18 and 19 which are secured thereto at the end in any suitable manner.

Wires 12 and 18 and 19 are preferably coated with an insulating cement to prevent glow thereon and the backs of electrodes a, b and c preferably are also coated with insulating cement to reduce current consumption or to increase the brilliancy of the glowing portions for a given current consumption.

Having described the mechanical construction of the negative glow devices, I will now refer to Figs. 6 and 7 for the description of the control means for the electrodes.

In these figures, a source of power indicated at 20 furnishes current at a sufficient potential to ionize the gas in the tubes or envelopes when properly connected to the thermostatic control elements or switches 21 and 22. A transformer 20 may, of course, receive its current from any suitable source. The thermostatic switches 21 and 22 have their heating coils connected as shown directly back to a mid-point on the transformer 20 so that, when these switches are closed, the flow of current through the heating coils will heat them up and cause the thermostats to open after a period of time. As shown in Fig. 6, thermostat 21 is connected throughout to electrodes a of the negative glow devices when they are placed in the sockets. Electrodes b are connected through thermostatic switch 22, while electrodes c are connected through the current limiting devices indicated at 23 to the opposite side of the source of potential 20.

The thermostats 21 and 22 are of the type shown and described more fully in my copending application Serial No. 516,079, filed February 16, 1931, on circuits for negative glow devices. These thermostats as shown in Figs. 6 and 7 have their heating coils connected at one end to the midpoint of transformer 20 and at the other end directly to the thermostatic elements which thus form part of the circuits when they are closed against the contacts associated with the free ends of the thermostatic elements. Each heating coil, therefore, is placed directly across the 110 volt line while its thermostatic switch is closed.

The operations that take place depend, of course, upon the setting of the thermostats 21 and 22, that is to say, upon the time it takes them to open and close.

As an illustration of what may take place, let us assume that thermostat 22 is closed. Then, when thermostat 21 is open, the high voltage across electrodes b and c will cause a discharge therebetween and both b and c will glow while electrode a will be dark thus giving a dark center to the character with a bright border for the background. Then, when thermostat 21 closes, electrode a, being smaller than b, will take less current than b of the total amount allowed and, also because it is farther away from c than b, its current will be limited so a will be only half bright; b will be brighter, but will not have its full brilliancy; and c receiving the discharge from both a and b will be at its maximum brightness thus forming a brilliant outline or border which gradually darkens toward the center.

Now, when 22 is open and 21 is closed, electrodes a and c will be illuminated thus giving the effect of a bright center, a dark intermediate space, and a bright border, and with a rather high gas pressure fiery streamers will move from 1 to 3 and will give a burning effect to the character. Then, when both thermostats 21 and 22 are open, the elements are all dark. These changes may take place at predetermined intervals by properly adjusting the thermostatic elements 21 and 22.

In order to obtain further variations when a plurality of negative glow devices are employed, the system shown in Fig. 7 may be used. In this system, it will be noted that for the left hand socket for example thermostat 21 controls electrode b, while for the middle socket it controls electrode c, and, for the right hand socket, it controls electrode a. Similarly, thermostat 22 controls a different electrode on each socket thus giving many different effects upon different letters of the sign.

As an example, assuming that thermostat switch 22 is closed and 21 is open on the left hand socket, current will be flowing from a to c while b would be dark; on the middle socket current would be flowing from a to b, and c will be dark; while on the right hand socket current will be flowing between b, and c and a will be dark.

In the modified form shown in Fig. 5, still further effects can be obtained owing to the fact that two distinct borders may be made dark or light in combination with the body portion of the letter. It is, of course, obvious that further effects can be obtained by adding additional electrodes of different sizes or by the particular construction, as for example by making some of the electrodes of a mesh rather than a solid construction, as the mesh is somewhat transparent and also has a different tone than the solid plate when illuminated.

From the above description, it is believed the construction and operation of this device will be clear to those skilled in this art and the advantages thereof readily apparent.

Having thus described my invention, what I claim as new and desire to secure by Letters Patent is:

1. A negative glow device comprising an envelope having a gaseous filling and having more than two electrodes therein forming a character, a source of alternating current for said electrodes, and means for causing successive changes in the quantity of current flow between electrodes thereby causing said character to change in appearance while retaining its identity, said character being made up of electrodes of similar configuration so arranged that borders of at least two electrodes are visible from one side of said device.

2. A negative glow device comprising an envelope having a gaseous filling and having more than two electrodes therein forming a character, said electrodes being spaced to provide configurations of said character in at least two planes which configurations are at least partly visible from one side of the device, a source of alternating current for said electrodes, and means for causing successive changes in the current flow between electrodes thereby causing said character to change in appearance while retaining its identity and characteristic glow.

3. In a negative glow device a series of electrodes of similar configuration forming a design, said electrodes being arranged so that the design when viewed from the front is shown in full by the front electrode and in outline by at least one of the electrodes behind the front one, and means for successively passing alternating current between the front electrode and some rear electrode and between the rear electrodes to the exclusion of the front electrode.

4. In a negative glow device, a series of electrodes of similar configuration forming a design, said electrodes being arranged so that the design when viewed from the front is shown in full by the front electrode and in outline by at least one of the electrodes behind the front one, a source of alternating current supply for said electrodes, and control means for varying the current flow between said electrodes whereby to change the appearance of the design.

5. A negative glow display pattern made up of a plurality of envelopes having character forming electrodes therein each forming at least a portion of a character, a source of alternating current supply, and control means for causing successive changes in the current flow between electrodes in said envelopes whereby to continually vary the appearances of the characters, said control means and electrodes being connected differently in different envelopes so as to produce different changes in appearance of characters at the same time.

6. A negative glow device comprising an envelope having a gaseous filling and a series of at least three electrode plates of similar outline but at least two of which are of different size the smaller of the two being placed on the outside of the series, an alternating current source, and control means interposed between said source and said electrodes causing current to flow between the small electrode and an electrode other than the one adjacent it at one time and between the other electrodes excluding the small electrode at another time.

7. In a negative glow tube, a series of three plate like electrodes arranged side by side, a source of alternating current, and control means operative to cause current to pass between the two outer electrodes while maintaining the intermediate electrode dark.

8. In a negative glow tube, a series of three plate-like electrodes arranged side by side, a source of alternating current and control means operative to successively cause current to pass between the front electrode and some rear electrode, and between the rear electrodes to the exclusion of the front electrode.

ANDREW F. HENNINGER, Jr.